3,721,585
METHOD FOR MANUFACTURE OF LACTOSE
Leo H. Francis, Burlingame, and Henry L. Pollard, Millbrae, Calif., assignors to Foremost McKesson, Inc., San Francisco, Calif.
Continuation of abandoned application Ser. No. 840,129, June 27, 1969, which is a continuation-in-part of application Ser. No. 477,852, Aug. 6, 1965. This application Jan. 28, 1971, Ser. No. 110,743
Int. Cl. C13k 5/00
U.S. Cl. 127—60      4 Claims

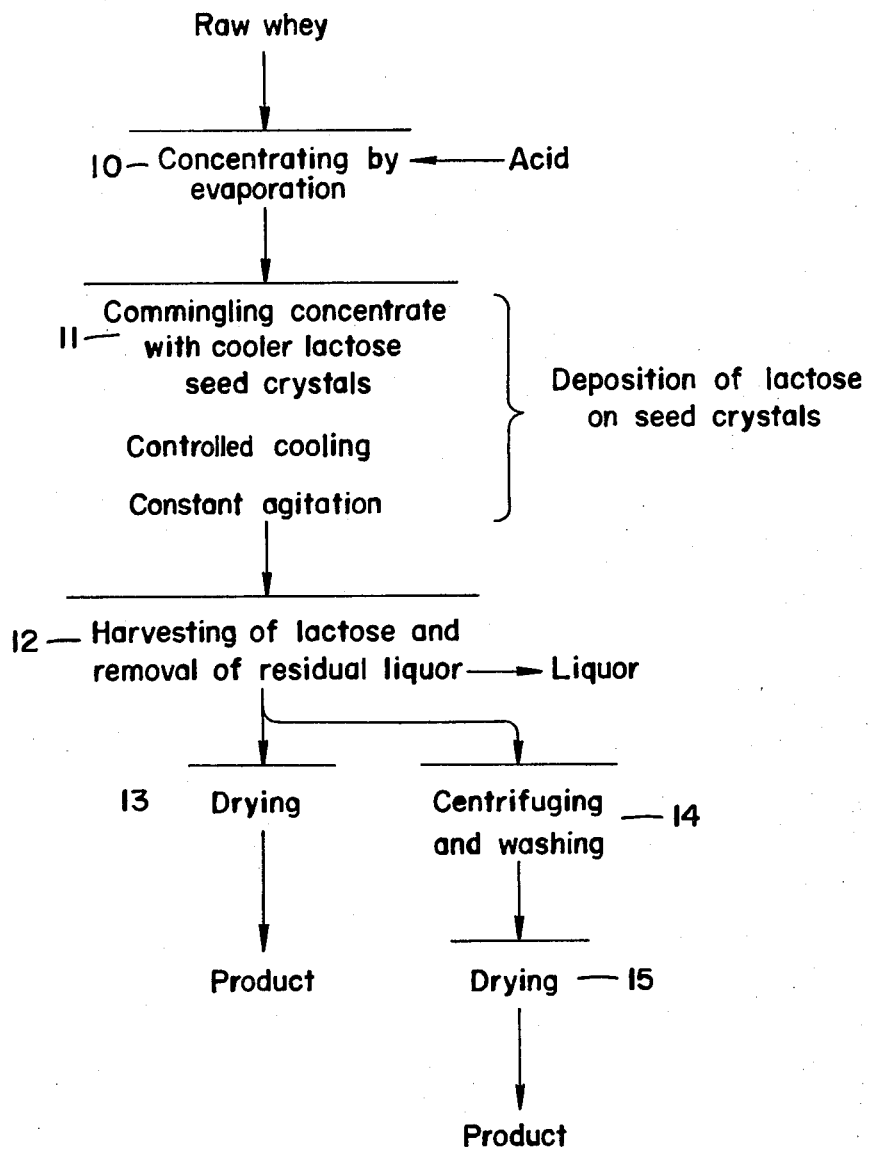
FIG_1

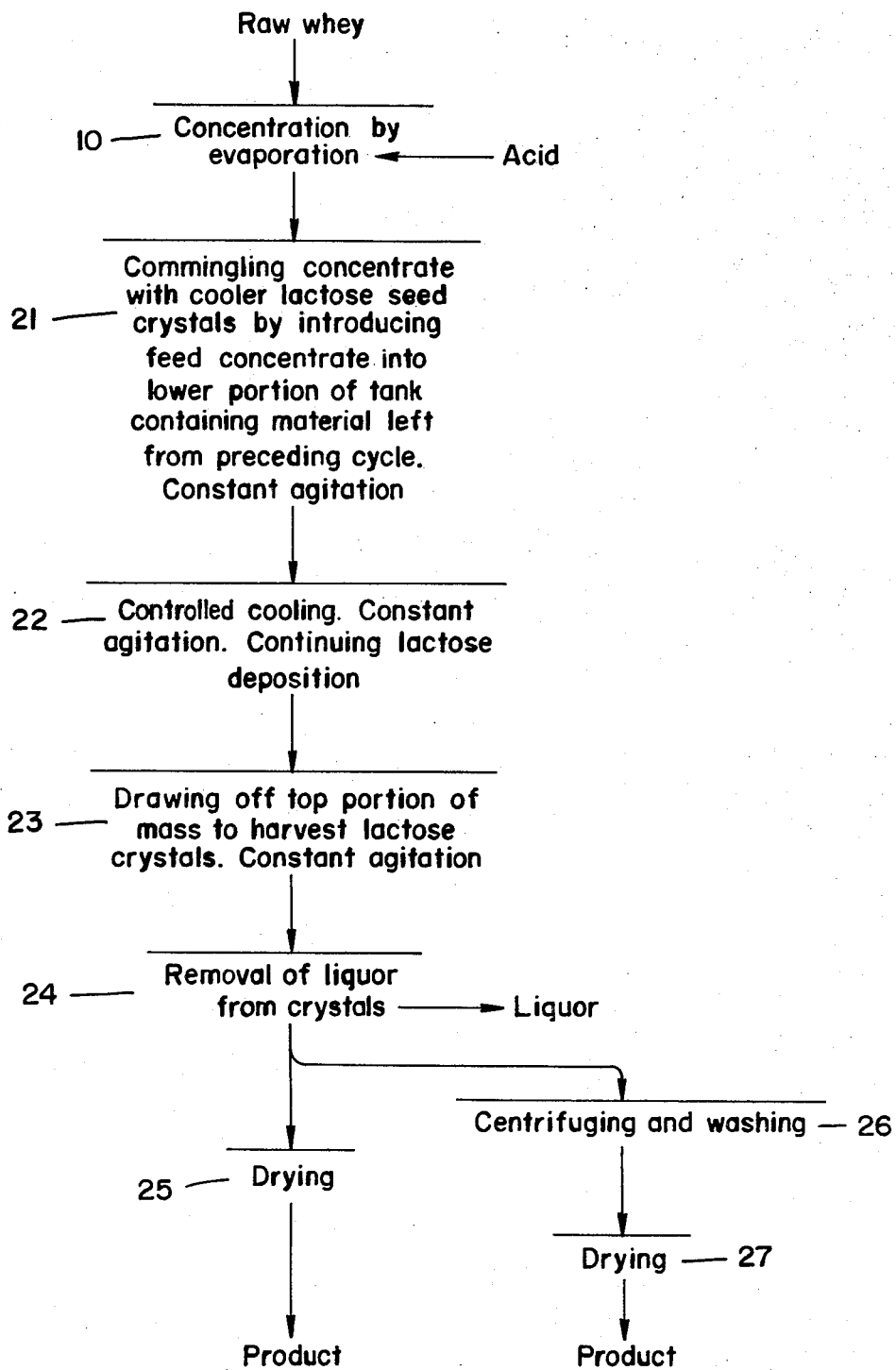
FIG_2

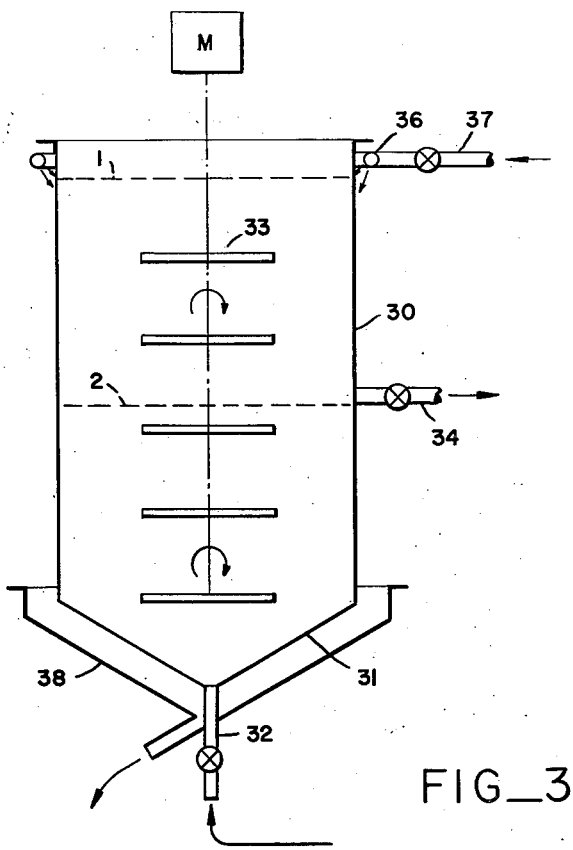
FIG_3
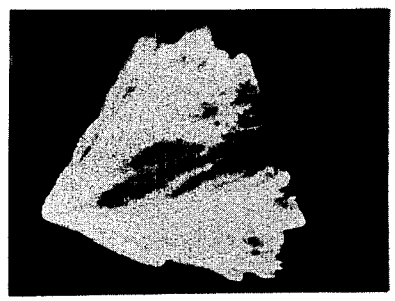
FIG_5
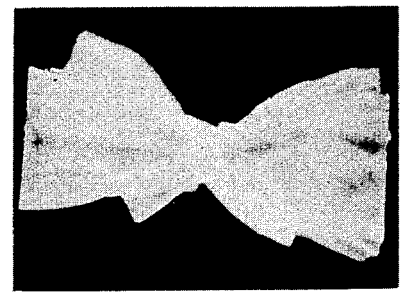
FIG_6

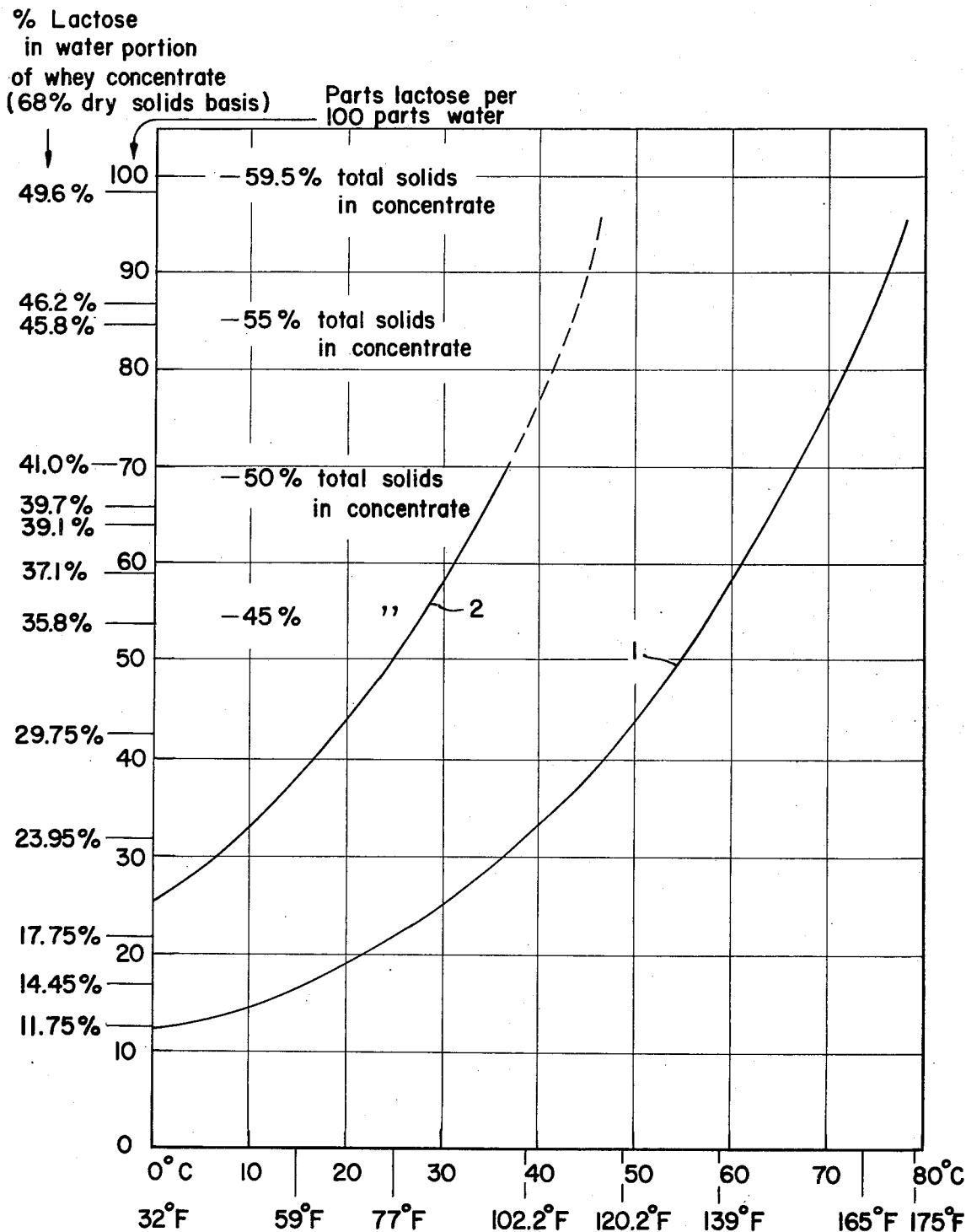
FIG_4 ent Office 3,721,585
Patented Mar. 20, 1973

ABSTRACT OF THE DISCLOSURE

Process for removing lactose from whey in which a crystallizing cycle is commenced by introducing a quantity of whey concentrate at an elevated temperature into the lower end of a crystallizing tank. The tank contains a seed bed comprising a quantity of liquor and lactose seed crystals left from a preceding cycle, whereby the incoming concentrate flows upwardly through the seed bed. Crystallization of lactose from solution commences by deposition of lactose on the seed crystals. After the batch of concentrate has been introduced, crystallization is continued until the end of the cycle during which time the mass of material in the tank is subjected to cooling. At the end of the cycle a quantity of material is withdrawn from the upper portion of the tank and lactose crystals removed from the same. The material remaining in the tank forms a seed bed for the next cycle. The material in the tank is continuously agitated throughout introduction of the concentrate, during the subsequent part of the crystallizing cycle and during withdrawal of material from the tank at the end of the crystallizing cycle.

REFERENCE TO COPENDING APPLICATION

This application is a continuation of our copending application Ser. No. 840,129 filed June 27, 1969, now abandoned which is in turn a continuation-in-part of our copending application Ser. No. 477,852 filed Aug 6, 1965 for "Method for Manufacture of Lactose," now abandoned.

BACKGROUND OF THE INVENTION

Lactose is presently being manufactured commercially by crystallization from whey concentrate. Such a method is disclosed, for example, in Peebles Pat. 2,439,612, and in general involves concentration of whey by evaporation, followed by crystallization of the lactose and harvesting of the crystals from the entire batch. If some of the batch is left in the crystallizing tank to provide seed crystals from the next batch, the part taken is removed from the bottom, and the next batch is delivered on top of the part remaining. The harvested crystals may be purified or refined in various ways, such as centrifuging with washing, and recrystallization. Such prior methods are subject to a number of disadvantages. Particularly, an extended time of the order of 3 or 4 days is required to complete the crystallizing cycle. This is a serious limitation on the capacity of a given plant, and considerably increases the overall cost of manufacture. It has been observed that crystals from such a conventional method are generally of the true tomahawk type, as distinguished from the aggregates hereinafter described. Seeding, when practiced in conventional methods, requires the setting of a new seed bed for each harvesting cycle.

SUMMARY OF THE INVENTION AND OBJECTS

This invention relates generally to commercial methods for the manufacture of lactose from whey.

In general, it is an object of the present invention to provide a method for the manufacture of lactose which greatly reduces the time required for each crystallizing cycle.

Another object of the invention is to provide a lactose manufacturing method which employs seed crystals in such a manner that they are not subject to serious deterioration after repeated cycles.

Another object of the invention is to provide a lactose manufacturing method which produces a distinctive type of lactose crystal, namely one that has needle-like points and which feels hard and sharp when squeezed in the hand.

Another object of the invention is to provide a method which is controlled with respect to the nature of crystallization taking place, and which effects deposition of lactose on the surface of the existing mass of seed crystals with a minimum amount of crystallization in the form of de novo crystals.

Additional objects and features of the invention will appear from the following description in which the preferred embodiments have been set forth in detail in conjunction with the accompanying drawing.

Referring to the drawing:

FIG. 1 is a flow diagram illustrating the general aspects of our method;

FIG. 2 is another flow diagram illustrating a more specific procedure for carrying out our method;

FIG. 3 is a schematic side elevational view showing crystallizing apparatus useful for carrying out the method;

FIG. 4 shows solubility curves for lactose concentrates;

FIG. 5 is a microphotoshowing the nature of lactose crystals forming the bulk of the seed crystals; and FIG. 6 is a microphotoshowing more complex crystal aggregation forming a minor part of the seed crystals.

DETAILED DESCRIPTION OF THE PREFERRED EMBODIMENTS

Referring to FIG. 1, raw whey is shown being supplied to step 10 where it is concentrated by vacuum evaporation. During concentration, it is desirable to add and acid such as sulfuric acid to reduce viscosity during the crystallizing step. In step 11, the whey concentrate is commingled with an initially cooler concentrated lactose seed crystal bed. As will be presently explained, this is carried out in a particular manner characterized by introducing the concentrate feed into the lower part of the crystallizing tank which contains a substantial amount of material left from a preceding cycle. The resulting heat exchange between the feed and the material present from the preceding cycle causes an immediate drop in the temperature of the incoming feed, and thereafter the crystals of the mass are gradually cooled under conditions of constant agitation throughout a crystallizing period which may extend from 12 to 24 hours. As indicated in FIG. 1, throughout step 11 lactose is being deposited upon the seed lactose crystal bed with negligible formation of de novo lactose crystals. In step 12, lactose is harvested from material drawn off from the upper part of the tank after the crystallizing operation in step 11, and such harvesting may involve various procedures for the removal of lactose from the mother liquor. For example we can use the method disclosed and claimed in Pat. No. 2,768,912, which involves use of a rotating reel. The resulting crystal mass can be subjected to drying in step 13 to produce a final dried product. Assuming that a more refined lactose is desired, the lactose can be subjected to centrifuging and washing in step 14, and thereafter subjected to drying in step 15 to produce a refined product. In addition to these procedures, the lactose can be subjected to solution and recrystallization by known methods to produce relatively pure forms of lactose.

In the commercial application of our method, we have employed a procedure shown in FIG. 2. Thus, the raw whey is again subjected to concentration by evaporation in step 10, and sulfuric acid added to the whey to control viscosity. The method in this instance is carried out in batch fashion, and step 21 represents introduction of a batch of the concentrate into the lower end of a crystallizing tank. The tank already contains cooler lactose crystals and mother liquor left from a preceding batch. The contents of the tank are continuously agitated during this introduction and, in fact, throughout the cycle. The initial cooling of the concentrate takes place simultaneously with commencement of lactose deposition upon the lactose seed crystals present. In step 22, the tank and its contents are subjected to controlled cooling under such conditions that crystallization of lactose from the concentrate continues at a high rate by further deposition upon the lactose seed crystals with minimum formation of de novo crystals. Step 23 takes place at the end of the crystallizing period which may extend from 12 to 24 hours. It consists in drawing off the upper portion of the mass in the tank with the part not drawn off remaining to provide seed crystals for the next batch of material. Step 24 represents the removal of mother liquor from the crystals in the drawn off material. This step may be carried out by the method of Pat. No. 2,768,912, as explained above. Steps 25, 26 and 27 correspond with the steps 13, 14 and 15 of FIG. 1.

FIG. 3 represents simple apparatus for carrying out the procedure of FIG. 2. It consists of a crystallizing tank 30 provided with a conical shaped lower portion 31, and a lower connecting pipe 32 for introducing the whey concentrate. The interior of the tank is provided with a motor driven agitator 33. A valve controlled pipe 34 connects through one side wall of the tank, and is used to draw off a portion of the contents. The cooling means illustrated consists of a manifold spray pipe 36 which surrounds the upper end of the tank and is connected to the cold water supply pipe 37. With this arrangement, sprays of cold water are directed against the side walls of the tank and run down to the lower end, where they may be collected by a pan 38. In place of the cooling means just described, the tank may be provided with a jacket for receiving cooling water, or internal coils or like heat absorbing means through which cooling water is circulated.

Dotted line 1 represents the level of the material within the tank during a crystallizing operation, or immediately after introduction of the concentrate, and dotted line 2 represents the level after the upper part of the mass has been withdrawn at the end of a crystallizing operation. It may be explained that the agitation is such as to produce visible eddy currents at the surface of the mass, with sufficient turbulence within the tank to keep the lactose crystals in a constant state of motion and suspension. As will be presently explained in greater detail there is a general but differential distribution of the lactose crystals throughout the height of the tank. However, the heavier lactose crystals may tend to find their way into the lower portion of the tank. Also the concentration of lactose crystals per unit volume of liquor increases from the upper to the lower portion of the tank.

With respect to the source material employed with the procedure of FIG. 2, we have obtained good results in commercial operations using cheese whey. A typical cheese whey of the cottage cheese type may have 6.3% solids, 0.6% acidity (mainly lactic), a pH of 4.6, and 68% lactose (dry solids basis).

Concentration by vacuum evaporation in step 10 can be carried out by ordinary multi-stage vacuum evaporating equipment. Concentration should be carried out to about 50 to 65% solids content, about 55 to 60% being considered optimum. The sulfuric or other acid to control viscosity is added when the concentration has reached about 20 to 25% solids. Assuming the use of a multi-stage vacuum evaporator, the acid can be added before the last stage or pass. In general, sufficient sulfuric acid is added to produce the desired control over viscosity. For example, with cottage cheese whey it has been found that 1 pound of sulfuric acid per 100 pounds of whey solids will produce the desired effect. After addition of the sulfuric acid, the hydrogen ion concentration of the concentrate is from pH 3.5 to 4.2.

As introduced into step 21, the temperature of the concentrate may range from 130 to 165° F., depending somewhat upon the concentration. In general, it is desirable to utilize higher temperatures for the higher concentrations. Optimum temperature of the concentrate being introduced into step 21 is from about 135 to 138° F.

As previously explained, immediately upon the introduction of concentrate into step 21, there is a rapid drop in temperature due to commingling with the cooler (e.g., 60 to 80° F.) seed crystals mass in mother liquor left from the preceding cycle. The temperature of the combined mass immediately after introducing the concentrate can be of the order of from 80 to 120° F., again depending substantially upon the temperature of the incoming concentrate. Optimum temperature at this point is from about 100 to 110° F.

Cooling water is continually applied to the crystallizing tank commencing with the beginning of step 21 and continuing throughout the crystallizing period. The cooling rate is controlled whereby the contents of the tank are cooled to a temperature level of the order of from 60 to 90° F. (80 to 85° F. optimum), over a period of from 12 to 24 hours (18 to 20 hours optimum), to a terminal temperature of from 60 to 90° F. According to our observation, this involves cooling rates ranging from about ½ to 3° F. per hour, the average cooling rate being about ¾ to 1¾° F. per hour (about 1° F. per hour optimum).

At the end of the crystallizing step, pipe 34 is opened while agitation is continued, whereby that portion of the tank contents above the level of this pipe is drawn off, leaving the lower portion remaining for the next succeeding batch. The amount so withdrawn may range from about 50 to 75% of the entire mass in the tank.

Operation in the manner described above makes possible a number of advantageous results. It is well known that lactose exists in solution in an equilibrium of the alpha and beta forms, but crystallizes in the alpha monohydrate form only. Therefore, during the crystallizing operation, mutarotation from beta to the alpha form must take place concomitantly with deposition of lactose from the concentrate on seed crystals. We have found that mutarotation from beta to alpha form does effectively take place and permits rapid crystallization under the conditions of our method.

Curves 1 and 2 of FIG. 4 show temperature-solubility curves for lactose and relates such to the composition of concentrates from a given whey. Curve 1 represents maximum solubility above which the concentrate is in the condition of supersolubility. Curve 2 represents the limit of supersolubility, above which lactose crystallizes directly (i.e. de novo) from the concentrate. Our method effectively controls the conditions whereby as the temperature of the mass lowers, the conditions remain at all times between the two curves 1 and 2, and on or relatively close below the curve 2. In other words, excursions above the curve 2 are minimized or prevented, thus preventing the formation of de novo lactose crystals. This feature of our method also makes for maximum concentration differential throughout the crystallizing operation. Concentration differential is the driving force for formation of lactose crystals from the whey concentrate.

Our method also provides effective surface areas for deposition of lactose. This is due in part to the constant agitation and to the introduction of concentrate into the bottom of the crystallizing tank. Also, in part, it is due to the character of the seed crystals employed. As will be presently explained in greater detail, the seed crystals are of optimum size and total surface area for deposition of lactose thereon.

A further advantage of our method is that the crystallized lactose made available for harvesting makes possible high efficiency treatment of the crystal mass for elimination of mother liquor and for refining. The harvested crystals are relatively large and hard, and the amount of fine crystalline lactose present representing de novo crystals is at a minimum.

A feature of our method is that the mass from which lactose crystals is harvested is taken from the upper portion of the tank, and the feed of whey concentrate is introduced into the lower portion of the tank to flow upwardly through the bed of seed crystals left in the tank at the end of the preceding cycle. This causes upward diffusion of feed through the material (i.e., seed bed) left from the preceding cycle. As a result, crystallization of lactose from the feed by deposition on lactose seed crystals takes place during introduction of the concentrate and continues for the entire crystallizing cycle with a minimum amount of lactose forming de novo crystals.

According to our observations the seed crystals produced and maintained by our process are characteristically different from prior processes. By microscopic analysis in typical instances it has been found that at least 80% of the seed crystals are in the form of single aggregates, such as exemplified by the microphoto FIG. 5. When the length of these crystals are measured (from the pointed end) the sizes range from 0.7 to 0.8 mm. to 2.8 x 2.5 mm. Rarely crystals as large as 4 x 3 mm. are found. It has been observed that as these crystals grow in size, the width exceeds the length. A minor percentage, namely about 10% of the seed crystals are observed to exist as the double aggregates shown in the microphoto FIG. 6. Such crystals did not seem to be greater than about 5 x 6 mm. in size. Here again, in the larger crystals, the width exceeded the length. In rare instances crystals are found in which third and fourth single aggregates attach to the center of the double aggregates. For some reason that is not understood, there appears to be some resistance against such four-winged aggregates filling in to form a solid spherical mass. In the formation of all aggregates crystals always align themselves point toward point.

Another 10% of the seed crystals exist in the form of single crystals. The sizes of such single crystals appear to range from about 0.1 x 0.2 mm. to 0.9 x 1.2 mm. Width does not exceed length but approaches it in the larger crystals. It has been noted in some instances such single crystals develop to the stage of seven faces (seventh face is the tip of the smaller end).

It appears that the mass of seed crystals remains generally the same during the crystallizing cycle. However, the more complex aggregates are continually subdividing to form the simple aggregates of FIG. 5.

Previous reference has been made to the use of sulfuric acid to control the viscosity of the concentrate. Maintenance of a relatively low viscosity during concentration promotes formation of lactose crystals with minimum occlusion of other whey solids. In the foregoing description reference has been made to use of 1 pound of sulfuric acid per 100 pounds of whey solids. The amount used may vary in different instances depending upon the acidity of the source whey and its inherent tendency to develop viscosity during concentration. In place of sulfuric acid, other acids can be used such as hydrochloric, phosphoric, lactic or citric acids.

As an alternative to adding acid to control viscosity, the whey may be deproteinized by suitable methods. Thus, the whey before concentration may be flash heated to say 210° F. and held for 10 to 20 minutes to coagulate protein, after which the protein is removed by settlement and decantation or centrifuging.

In general, the whey employed will contain a certain amount of lactic acid, the amount depending upon the process from which the whey is derived. The presence of lactic acid is deemed to be desirable in that it promotes mutarotation of the lactose from the beta to the alpha form. In this connection, it is deemed desirable that the amount of lactic acid present be such as to approach the 1 N. in the solvent water.

Example No. 1.—An example of our method is as follows: The source of material was whey produced by a commercial cottage cheese process. The whey analyzed 6.3% solids, and 68% lactose (dry solids), with an acidity (mainly lactic) of 0.5% and a pH of 4.6. This whey was concentrated to 55% solids in three passes of vacuum evaporation, the concentrate leaving the last stage at a temperature of 135° F. Before entering the last stage sulfuric acid was added to the extent of 1 pound of sulfuric acid for each 100 pounds of whey solids. The equipment employed was substantially the same as that shown schematically in FIG. 3, the tank having a total capacity of about 6000 gallons. The seed and mother liquor left from the preceding batch occupied the lower one-half of the tank, and was at a temperature of 80° F. The agitator 33 was operated continuously to maintain the seed and mother liquor in continuous agitation. With cooling tap water at 70° F. being supplied through the pipe 37, the concentrate at a temperature of 130° F. was added to the tank through the pipe 32, over a period of about 30 minutes. At the end of this period of introduction the average temperature of the mass within the tank was about 100 to 106° F., and the seed crystals were kept in constant motion and suspension whereby they likewise were distributed throughout the tank. By virtue of the heat absorbed by the cooling water the contents of the tank gradually cooled over a crystallizing period of 20 hours. Initially, the degree of cooling was about 2° F. per hour and in the latter phases was about 0.5° F. per hour, giving an average cooling rate of about 1° F. per hour. Throughout this gradual cooling and crystallizing period agitation of the mass was continued. At the end of the 20 hours cooling period the mass within the tank was at a temperature of 80° F. At this time, the upper half of the mass was withdrawn through pipe 34, and treated by the method disclosed in Pat. No. 2,768,912 for separation of crystals from mother liquor. The remaining half of the mass was permitted to remain in the tank to serve as seed for the next batch. The lactose crystals removed for harvesting were found to be relatively hard and sharply pointed, as previously described, and the crystals upon microscopic analysis showed a form and a distribution as previously described. The lactose yield obtained was about 45 to 50% of the lactose present.

Example No. 2.—Repetitive cycles were made as described in Example No. 1, and in each instance the batch of material left from the preceding cycle, was used as seed. After three cycles the seed was examined and found to have improved. After ten cycles the seed was again examined and found to be substantially the same as after the first three cycles. In other words, the seed did not show signs of deterioration, thus indicating that the cycle can be repeated indefinitely.

The time period over which the feed concentrate is introduced into the lower end of the tank (e.g. 30 minutes in the above example) enables the desired crystallization to take place and avoids excess turbulence or upward channelling. In practice we have found that this period may be within the range of 30 to 90 minutes.

In the foregoing examples we have found that the quantity of lactose seed crystals present in the material left from a preceding cycle after 50% drawoff is such that the ratio of the seed mass to total dissolved lactose added in filling the tank is about 1:1, and the ratio of seed mass to the mass of lactose to be removed from the solution by crystallization is about 2:1. Removing a greater amount of material at the end of the cycle causes both ratios to be decreased. Preferably the amount of material removed is such that the first ratio is maintained at a value within the range of about 1:1 to 1:3

(1:1 optimum), and the second ratio within a range of about 2:1 to 1:1.5 (2:1 optimum), corresponding with the drawoff from the upper part of the tank ranging from about 50 to 75%.

As previously mentioned, a feature of our method is that the concentrate is pumped into the lower part of a dense massive layer or bed of seed lactose, thus promoting rapid deposition of lactose on the seed crystals, with minimum formation of de novo crystals. The continuous agitation throughout introduction of the feed and during the remainder of the crystallizing cycle causes continual movement of lactose crystals to promote effective contact with the lactose in solution. The seed bed through which the concentrate is introduced to flow upwardly through the same is relatively dense with respect to the amount of crystals present per unit volume of liquor, thus bringing the conditions within the ratio ranges specified above. During the crystallizing period following introduction of concentrate, there is some marked settling of lactose crystals by gravity, thereby tending to maintain a density in the lower portion of the tank that is somewhat greater than in the upper portion. This serves to provide a high density zone in the lower portion of the tank at the end of the crystallizing cycle which provides the desired high density seed bed for the next cycle.

We claim:

1. In a method for the manufacture of lactose from a whey concentrate having its lactose content in solution, a substantial part of which lactose is to be harvested in crystalline form, the steps of providing a massive bed of lactose seed crystals in the lower portion of a crystallizing tank together with mother liquor, the major part of the crystalline lactose of the seed bed being in the form of aggregates that are sharp to the feel, introducing said whey concentrate into the lower part of the tank during the initial part of a crystallizing period and causing it to flow upwardly through the seed bed while the contents of the tank are being subjected to continuous agitation, the concentrate at the time of introduction being at a temperature of about 130 to 165° F. and higher than the temperature of the massive seed bed, contact of lactose in solution in the whey concentrate with the seed crystals causing crystallization of lactose from the solution by deposition on the seed crystals with formation of further crystalline aggregates that are sharp to the feel and with negligible formation of de novo crystals, subjecting the contents of the tank to controlled cooling after completing the introduction of the concentrate while continuing agitation of the same to effect continued high rate of crystallization of lactose from the concentrate by further deposition on the aforesaid seed crystals to form said aggregates with negligible formation of de novo crystals, withdrawing an upper portion of the mass from the tank at the end of the crystallizing period, removing lactose crystals from the withdrawn portion and utilizing the lactose crystals and mother liquor remaining in the tank to form a seed bed for the next cycle.

2. A method as in claim 1 in which the ratio of the lactose seed crystals of the seed bed to the total dissolved lactose added to the seed bed by way of the concentrate ranges from about 1:1 to 1:3 and the ratio of crystalline lactose of the seed bed to the mass of lactose to be removed from the solution by crystallization ranges from about 2:1 to 1:1.

3. A method as in claim 1 in which after introduction of the whey concentrate the combined mass in the tank is at a temperature of about 80 to 120° F.

4. A method as in claim 3 in which from 50 to 75% of the material in the tank is drawn off for harvesting.

References Cited

UNITED STATES PATENTS

| | | | |
|---|---|---|---|
| 2,495,024 | 1/1950 | Sharp | 127—15 X |
| 2,346,517 | 4/1944 | Thompson | 127—6 D |
| 2,439,612 | 4/1948 | Peebles | 127—31 |
| 2,708,166 | 5/1955 | Tumerman | 127—31 X |

MORRIS O. WOLK, Primary Examiner

S. MARANTZ, Assistant Examiner

U.S. Cl. X.R.

99—57; 127—15